United States Patent [19]
Del Sole

[11] Patent Number: 5,907,972
[45] Date of Patent: Jun. 1, 1999

[54] RACING CAR REVERSE GEAR WHICH IS NON-ROTATABLE WHEN NOT ENGAGED

[76] Inventor: Robert Del Sole, 86 Valley Rd., Larchmont, N.Y. 10538

[21] Appl. No.: 08/912,661

[22] Filed: Aug. 18, 1997

[51] Int. Cl.[6] .................................................. B60K 41/26
[52] U.S. Cl. ............................................ 74/411.5; 74/339
[58] Field of Search .................................... 74/339, 411.5

[56] References Cited

U.S. PATENT DOCUMENTS

| | | | |
|---|---|---|---|
| 4,192,410 | 3/1980 | Poirier | 74/411.5 X |
| 4,430,904 | 2/1984 | Fogelberg | 74/411.5 |
| 4,503,957 | 3/1985 | Ikemoto et al. | 74/411.5 X |

Primary Examiner—Allan D. Herrmann
Attorney, Agent, or Firm—Richard A. Joel, Esq

[57] ABSTRACT

Racing car transmission in which the reverse gear does not rotate when the car is travelling in the forward direction. The main shaft in this transmission has shortened splines that do not engage the reverse idler gear except when the transmission is shifted into reverse. Provision is made for a spring biased pin on the gear shift yoke to engage the detent on the reverse idler gear hub to stop it from spinning when this gear is not in the engaged position. This improvement eliminates unnecessary rotational inertia when the vehicle is travelling in the forward direction thus eliminating unwanted inertia which saps power and speed from the engine. The improvement adds significantly to the available power of the engine.

4 Claims, 11 Drawing Sheets

RACING CAR REVERSE GEAR WHICH IS NON-ROTATABLE WHEN NOT ENGAGED

BACKGROUND OF THE INVENTION

1. Field of the Invention

This invention is directed to racing car transmissions having manual transmissions with reverse gears. At present in such transmissions the reverse gear continues to rotate when the reverse gear is disengaged and the car is running forward. An important consideration in racing cars is to minimize any turning torque at racing speeds which will slightly diminish the available power and therefore speed. Thus it is critical to eliminate all unnecessary rotational movement and/or parts in racing car engines or transmissions to maximize the available speed.

Since such vehicles are essentially stopped when there is shifting from reverse or into reverse from a forward gear it is unnecessary to consider any problem in moving the gears into or out of engagement with the clutch when simply shifting from reverse to forward, particularly in a fully stopped position. It would be extremely advantageous if the reverse gear did not rotate and generate any turning torque of the gear wheel at forward racing speeds. It is a constant goal to eliminate any unnecessary torque and pull. Elimination of the rotation of the reverse gear when the car is running in the forward direction alone could cut tenths of a second off time elapsed per lap, which, while at first blush seems very negligible, it is very significant in the racing environments. Additionally, reduction of the torque improves gas mileage which in the racing environment decreases the frequency and length of pit service stops which is an extremely valuable advantage.

In accordance with the present invention the splines of the main shaft on which the reverse gear is normally engaged are shortened and tapered so they are not engaged with the reverse gear when not in reverse. The gear only engages the splines on the remainder part of the shaft and starts turning as it is moved to engage when in reverse.

2. Prior Art

U.S. Pat. No. 4,532,821 —Hager shows a transmission primarily designed for racing cars and a disclosure that the reverse gear is operational only as long as the clutch is depressed. See Column 6, Lines 46, etc.

U.S. Pat. No. 4,836,041 —Falzoni et al discloses a transmission which deactivates the reverse gear when not in use. See Column 3, Lines 38, etc.

SUMMARY OF THE INVENTION

Motor vehicles, including racing cars require transmission systems. Commonly used transmissions for racing are those known as fully synchronized multi-speed manual transmissions. Such transmissions are generally similar, although there are minor differences involving first and reverse gearing. But all of them involve the selective sliding longitudinal displacement of a sleeve or collar from one gear engaging position to another with, in the case of low gear (i.e. first) and reverse, an intermediate disengaged position.

The gears are usually moved by a collar or that portion thereof which is moved by forks to cause selective predetermined gear engagement.

A general understanding of the operation of synchromesh transmissions can be obtained by reference to pages 104 and 105 of "The Bosch Book of the Motor Car" by John Day et al, St. Martin's Press, Inc., NYC (copyright 1975 by Robert Bosch Ltd.) (Book Reference)

The present invention improves the performance of racing cars and other vehicles by a development which eliminates the rotation of the reverse sliding gear on the main shaft of the transmission when the vehicle is moving forward.

This improvement eliminates significant unnecessary torque as well as friction generated when the reverse gear is turning with the main shaft when the vehicle is moving forward. Unnecessary torque not only slows the vehicle, but creates unnecessary friction and wear. When a vehicle is stopped or almost stopped the gears are essentially idle or not rotating with respect to each other. Going from engagement of the gears in forward into reverse it is possible to disengage the reverse gear from rotating on the main shaft when running in the forward position and to engage it on the shaft in shifting to reverse position.

This eliminates the rotation of the reverse gear on the main shaft when the vehicle is not in reverse. It is accomplished by a modification of the transmission gearing, in particular the splines on the main shaft on which the reverse gear is normally engaged at all times are shortened and a spring biased pin provided on the yoke to releaseably engage a detent on the hub of the reverse gear to halt its rotation when not engaged by the shaft.

When the vehicle is running forward or in neutral, the reverse gear is thus not rotated and is not engaged with the splines which rotate it on the main shaft when engaged.

This is achieved by eliminating about half the normal length splines on the main shaft and providing spline ramps so that the reverse gear may be engaged or slid onto the splines and slid off the splines to disengage the reverse sliding gear from the shaft when running in forward position and have it only engaged when running in reverse, thereby eliminating a significant amount of unnecessary inertia and friction.

In addition to shortening the splines, a spring detent pin is provided on the reverse shift yoke to releasably engage a recess on the rim of the reverse sliding gear. The reverse sliding gear when not engaged with the splines is thus not allowed to freewheel on the main shaft, when not being driven, to assure the elimination of the unwanted rotation and resulting generation of unwanted rotational inertia, and thus, the sapping of power.

The elimination of unnecessary inertia of the rotating reverse sliding gear is accomplished by a modification of the standard racing transmission. It is very easily accomplished and does not affect the function of other parts at all. This is achieved simply by shortening the splines on the main shaft that engage the reverse sliding gear and providing a spring biased pin in the base of the yoke of the reverse shift gear fork to engage a detent on the annular rim of the reverse sliding gear that normally is engaged by the shift fork. In order to accomplish this end, a notch is formed on the ridge of the rotating reverse gear rim and a spring loaded detent pin placed in an axial recess formed in the gear fork. This is all that is required.

BRIEF DESCRIPTION OF THE DRAWING

In the accompanying drawing which forms a part of this specification.

ILLUSTRATIVE SPECIFIC EMBODIMENT

Figure 1:
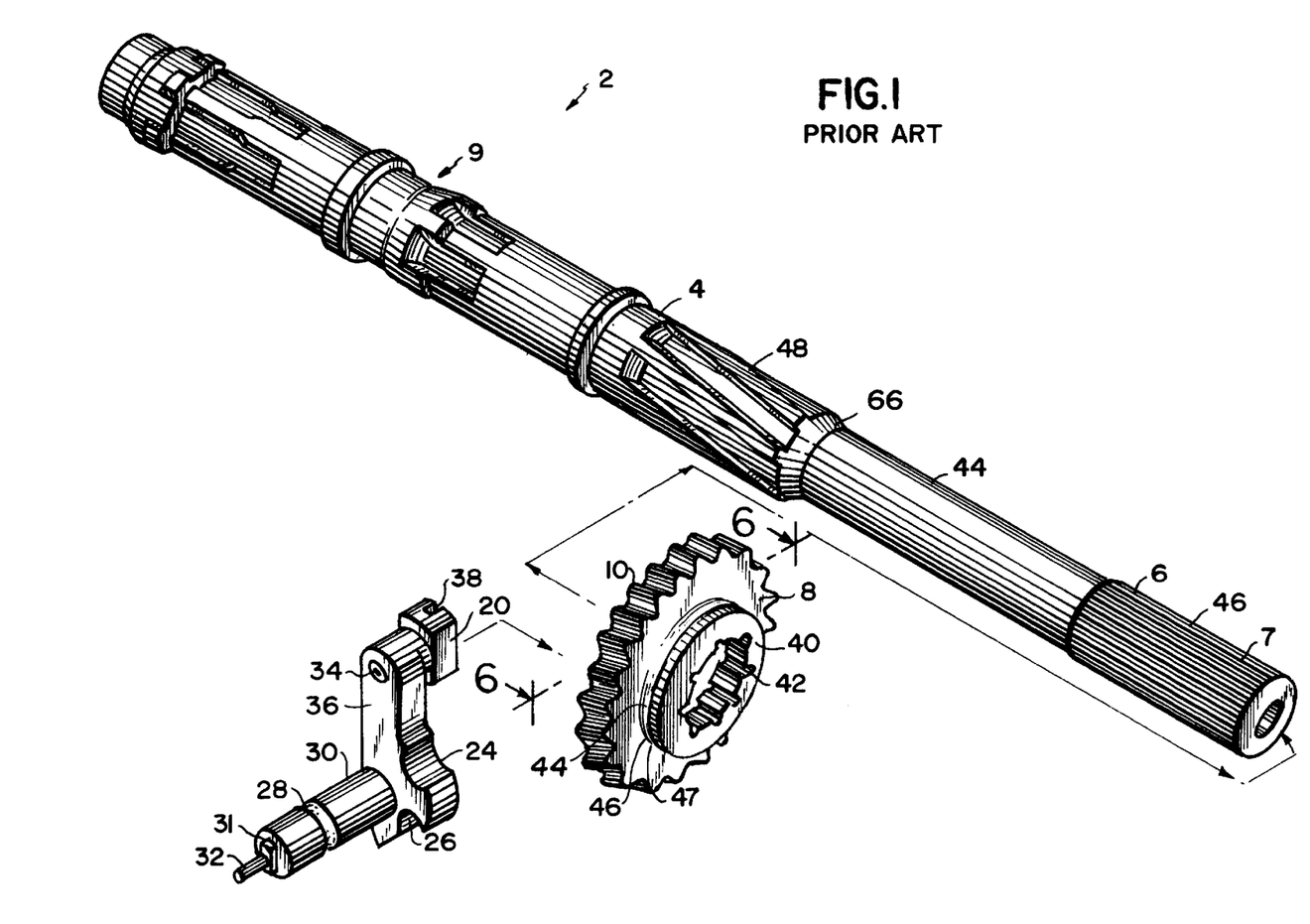
FIG. 1 is a perspective view of the main shaft of a racing transmission in accordance with the prior art and showing the reverse sliding gear, reverse gear shifting cam, and the reverse fork for engaging with the reverse sliding gear.
Figures 6, 7, 8, 9:
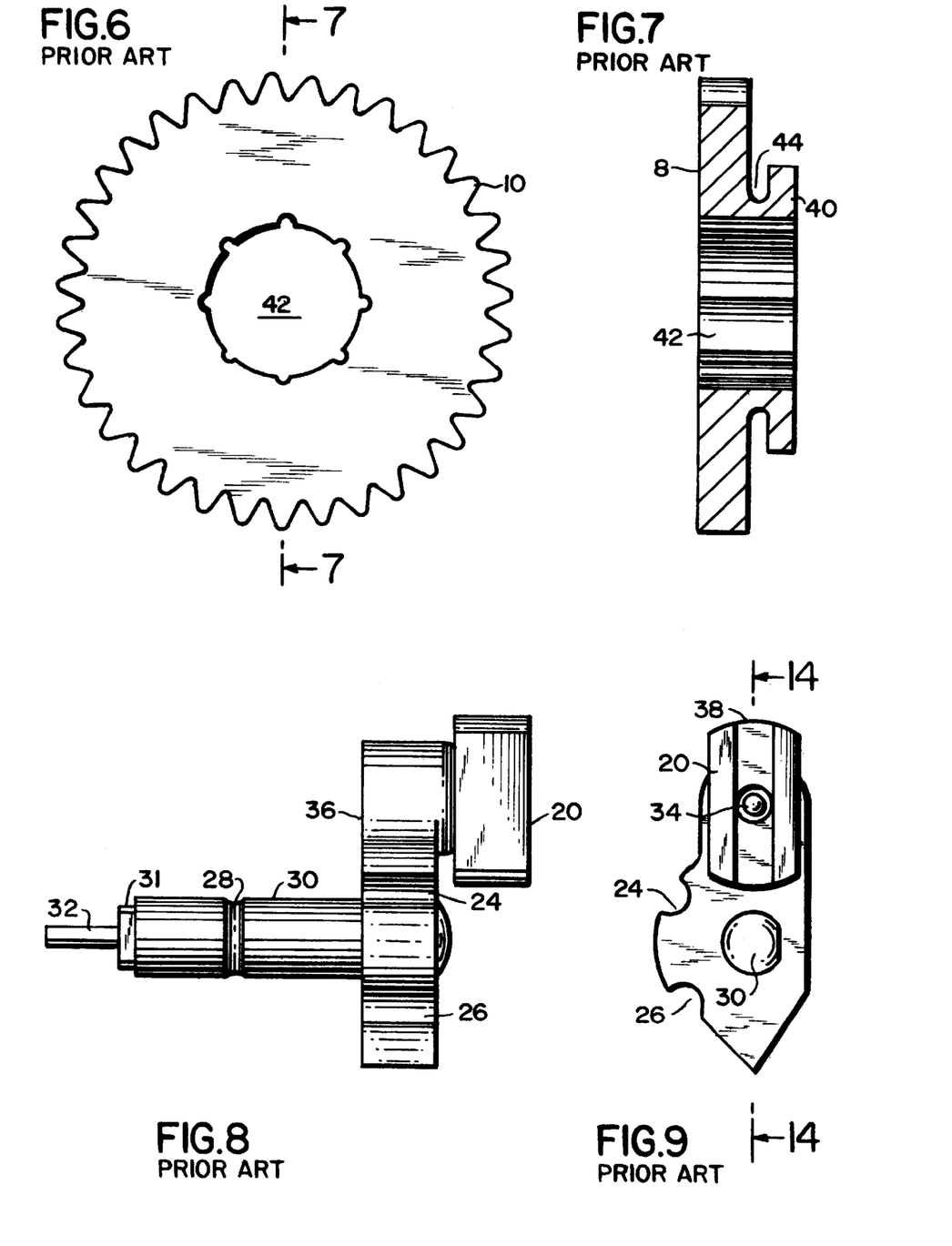
FIG. 6 is a plan view of the reverse sliding gear in accordance with the prior art, taken along lines 6—6 of FIG. 1.
FIG. 7 is sectional view taken along the lines 7—7 of FIG. 6.
FIG. 8 is a side view of the reverse cam and fork shown in FIG. 1.
FIG. 9 is an end view of the fork shown in FIG. 8.
Figures 10, 11:
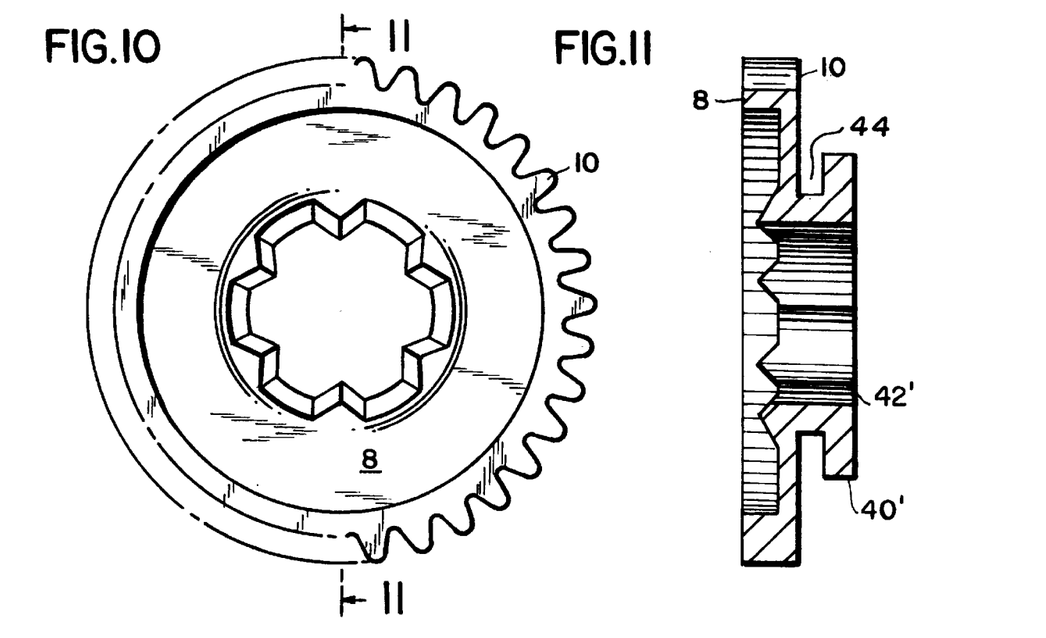
FIG. 10 is a plan view of the reverse sliding gear of the present invention.
FIG. 11 is a sectional view taken along the lines 11—11 of FIG. 10.
Figure 12:
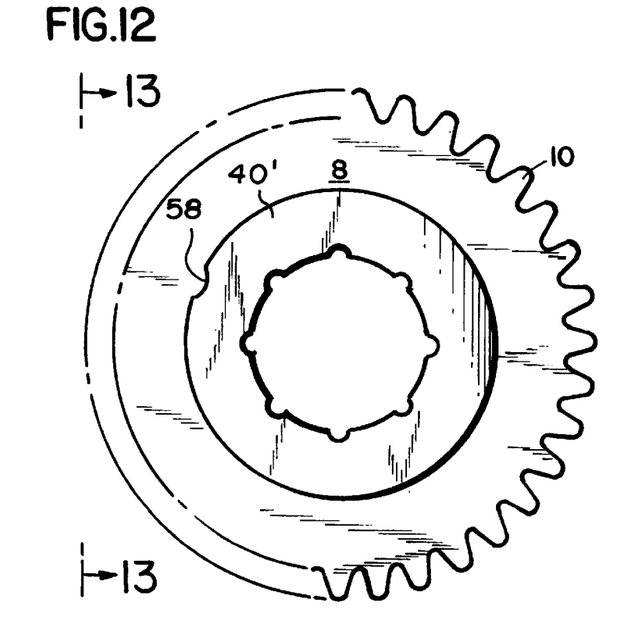
FIG. 12 is a plan taken from the opposite side of FIG. 10 showing the reverse sliding gear, and showing the detent for engagement by the stop pin.
Figure 13:
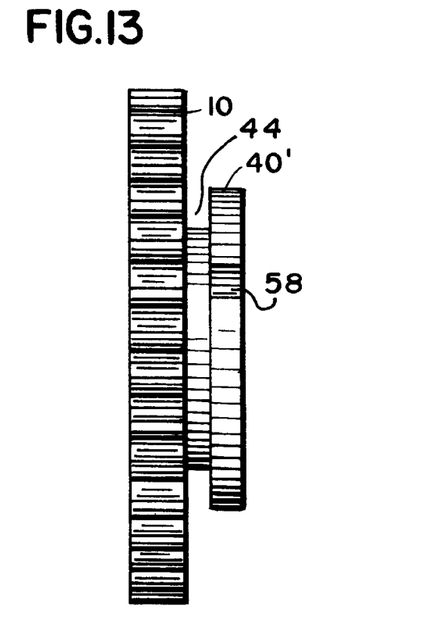
FIG. 13 is a view taken along lines 13—13 of FIG. 12.
Figure 14:
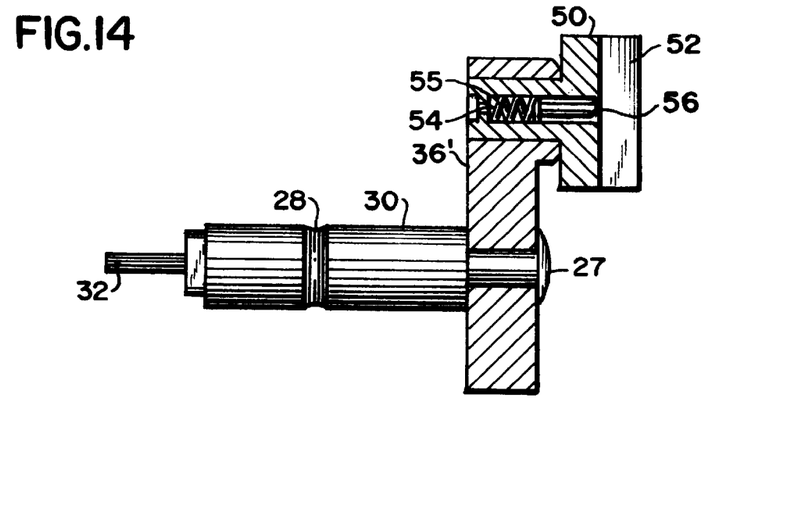
FIG. 14 is a side view, partially in section, along lines 14—14 of FIG. 9.
Figure 15:
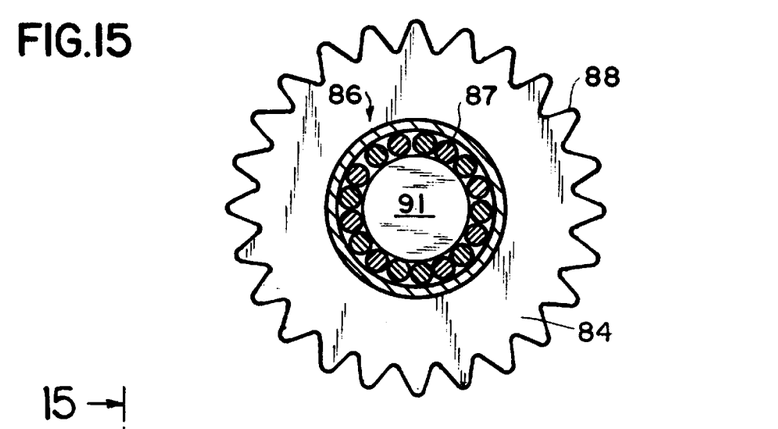
FIG. 15 is a sectional view of the reverse idler gear rear, shaft and bearings, taken along lines 15—15 of FIG. 16.
Figure 16:
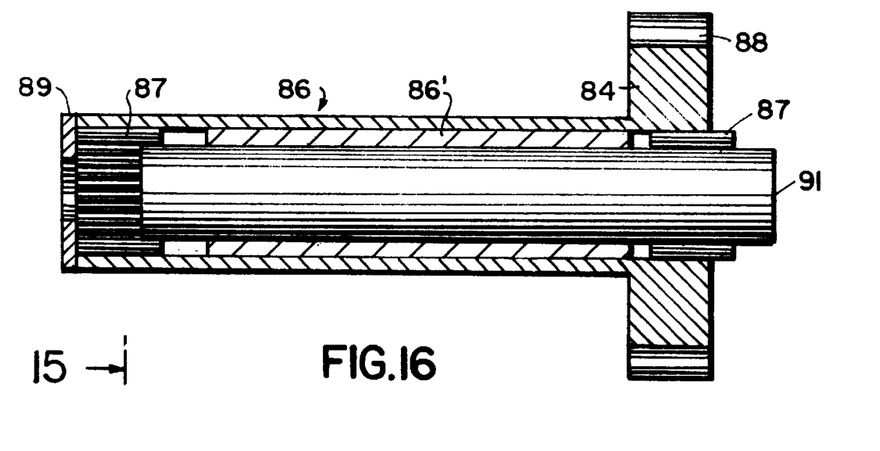
FIG. 16 is a sectional view of the reverse idler gear rear and shaft, taken along the longitudinal axis thereof.

In the accompanying drawing, FIGS. 1, and 6 and 9 illustrate the main shaft and reverse idler gear together with the reverse fork and shift cam in accordance with the prior art.

In FIG. 1, the main shaft 4 comprises transmission gearing 2 with splines 6 on tail piece, 7, reverse sliding gear 8 with the forward portion 9 of the shaft 4 being of standard configuration as shown. The splines 48 run to the shoulder 66.

The reverse sliding gear 8 as normally carried on the shaft 4 splines 48 as in FIG. 1. The reverse sliding gear 8 has teeth 10, hub 40, together with the axially extending portion 46 of the hub 40 with undercut annular groove 44 (see FIG. 7) for engagement by the fork 20 carried on the reverse shift cam or holder 36, having the two detents 24, 26.

The arrangement according to the present invention eliminates the spinning of the reverse sliding gear when the reverse gear is not engaged.

This is accomplished by shortening the splines 48 of the shaft 4. In the modified version, the shortened splines are shown at 78—see FIG. 2. The reverse sliding gear 8 on the main shaft 4 is provided with a non-engaged position 60 for that gear out of engagement with the main shaft splines 78.

The hub 40 of gear 8 that engages the shaft 4 is provided with a depression 58 that can be engaged by the spring biased pin 56 in the base 50 of the inner groove 52 so that the gear 8 is brought to a stop when not engaged by the gear shaft splines 78. The spring 54 pushes pin 56 into the depression 58 on the hub 40 of the gear 8 to prevent the gear 8 from free-wheeling, thus utilizing energy unnecessarily, and providing a turning torque which contributes to inertia, and thus saps the full potential of the drive train.

Figure 2:
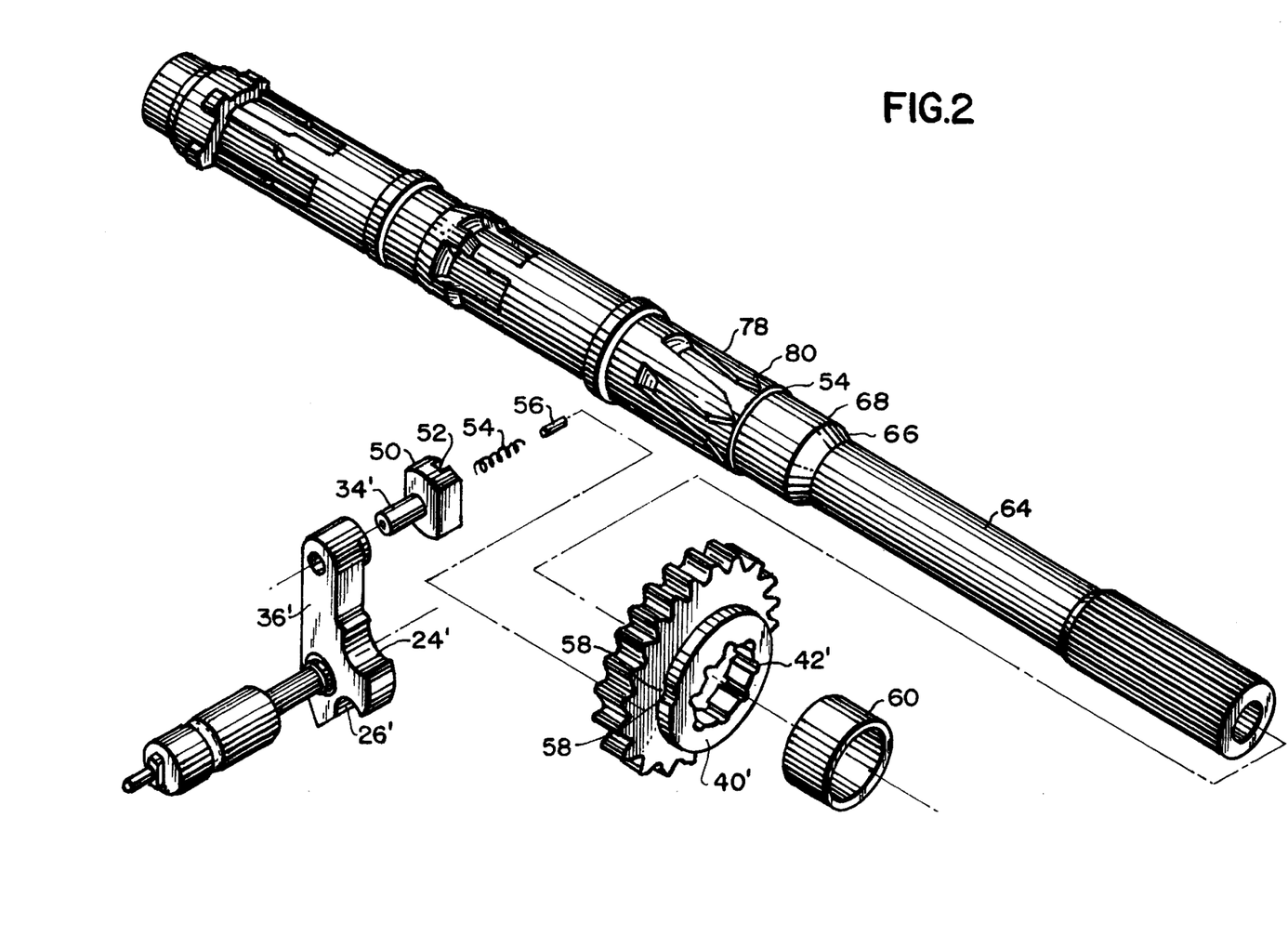
FIG. 2 is a perspective view of the main shaft, gear fork and reverse sliding gear modified in accordance with the present invention.
Figure 3:
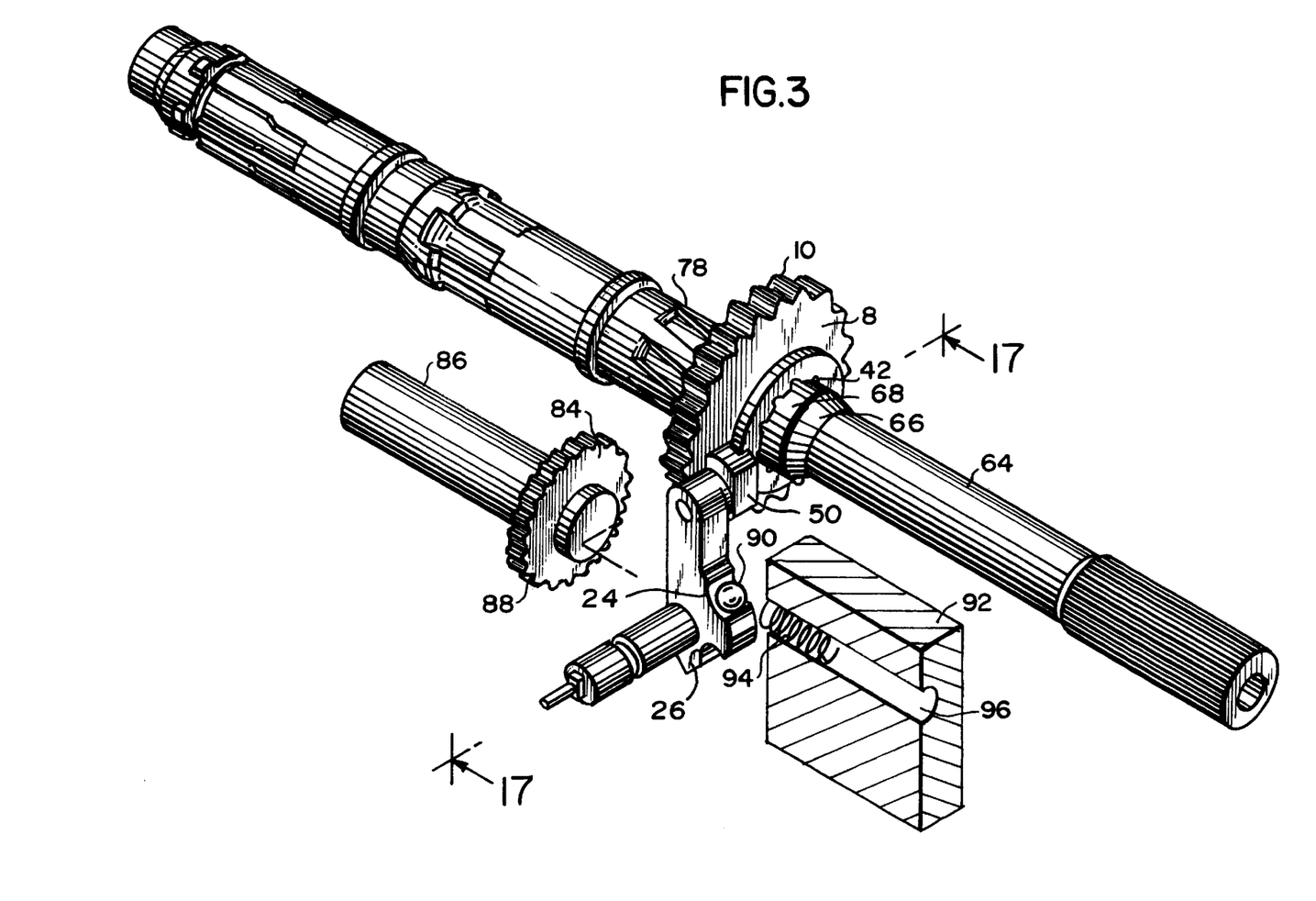
FIG. 3 is an assembly view similar to FIG. 2, showing the reverse sliding gear carried on the main shaft in an non-engaged position, the reverse gear, and the reverse gear detent block.
Figure 4:
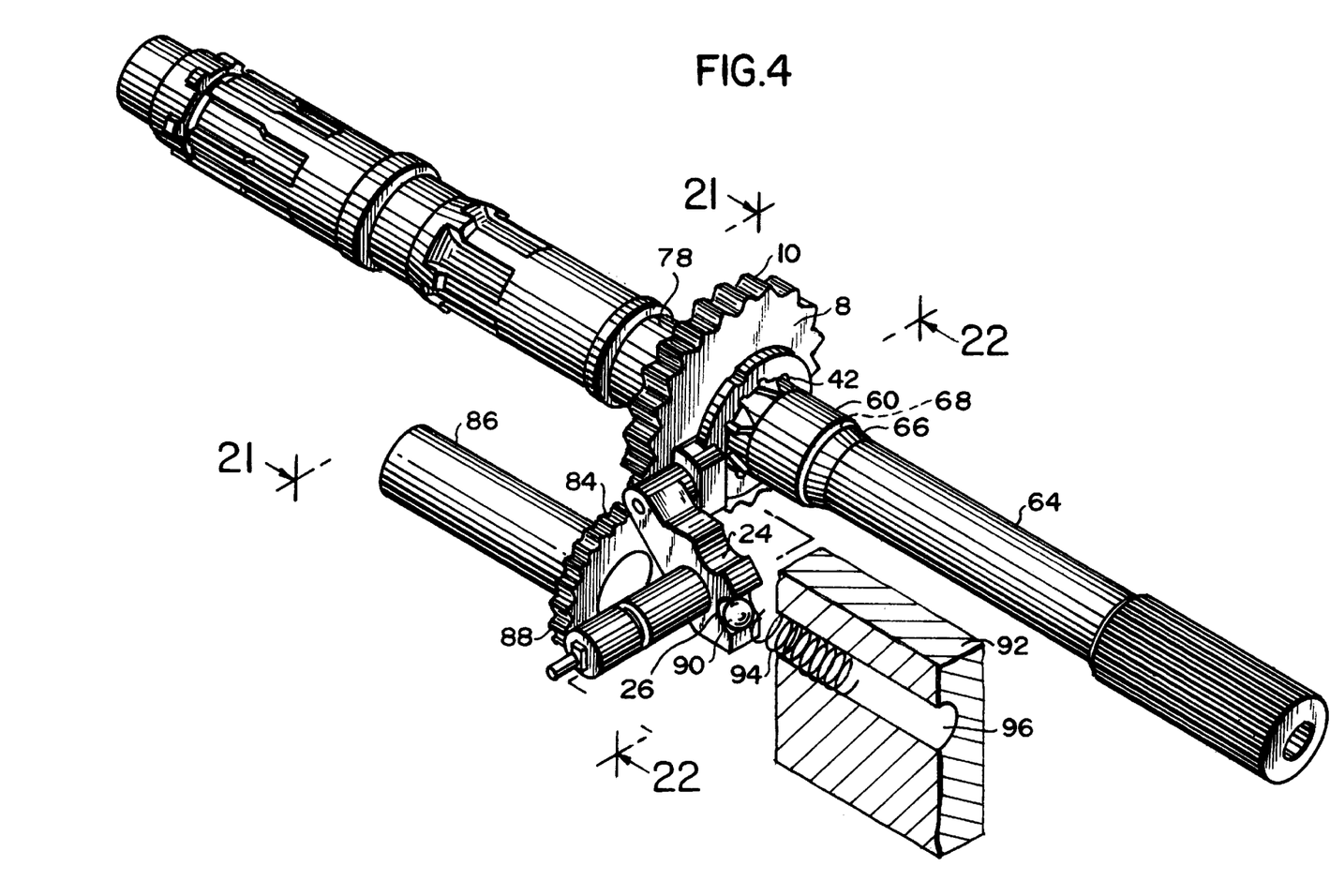
FIG. 4 is a perspective view of the parts shown in FIG. 3 with the fork yoke now thrown into the engaged position, the reverse sliding gear moved up along the main shaft engaging the splines of the main shaft as well as the teeth of the reverse gear.
Figure 5:
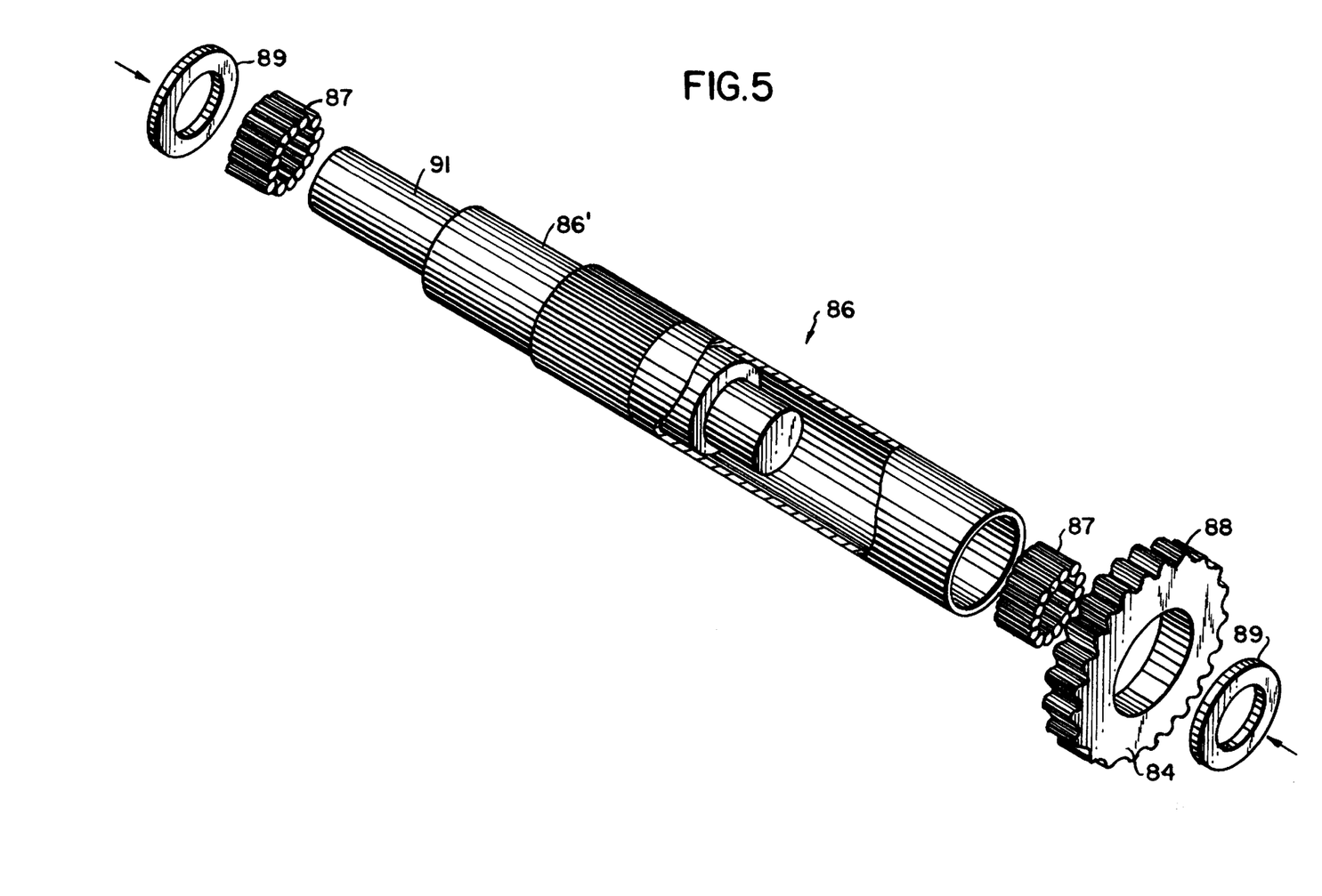
FIG. 5 is a perspective view of the reverse idler gear, rear, and shaft.

The objects of the present invention are readily accomplished by minor modifications of the gear train including shortening the splines 48 on the shaft 4 in FIG. 2 to new splines 78 with tapered ramps 80 in FIG. 2 for engaging the gear 8 as well as providing a spring biased ball detent on the ridge or hub of the gear which engages the yoke of the shift assembly.

The standard prior arrangement is shown in the accompanying FIGS. 1 and 6 through 10. The primed numbers in other Figures are parts which are equivalent in the old and new embodiment.

The groove 38 in the fork portion 20 engages the hub portion 40 with one side of the fork 20 riding in the groove 46 on the inner side of the hub portion 40. The inside of the hub 40 is grooved at 42 corresponding to the profile of the splines 78 on the main shaft 4 and with the twist of the splines 78 on the shaft 4. The intermediate portion 64 of the shaft 4 is called the tail shaft.

The body of the swivel shaft holder 36 has an aperture formed therein to retain the swivel shaft 34 of the extending rear relief of the fork 20. Detents 24 and 26 are formed in shaft holder 36 to retain the gear shift in the engaged and unengaged positions by engagement with the ball 90, biased into the recesses 24 and 26 by spring 94 carried in the recess 96 of the tail block 92. The shift fork 20 is carried rotatably on the shaft 30 which has seal groove 28 for sealing O rings at the end 31 thereof and passes through the gear case (not shown). The shift rod, not shown, is attached to lever 32 with the shaft 30 on lever case 31. The fork 20 is carried on the swivel shaft 34 which is retained in an aperture 55 in the swivel shaft holder 36. Other views of this are shown in FIGS. 2 through 5.

These parts, including the fork 20 and the gear 8 are unchanged in the present improvement from the standard transmission arrangement shown in FIGS. 1 and 6 through 9.

A modified version of the main shaft 4 in accordance with the present invention is shown in FIGS. 2–5.

As seen, the splines 78 are significantly shortened from the original 48, FIG. 1, leaving a bearing surface 68 on the main shaft 4 for the reverse sliding gear 8 to idle on when not engaged on the splines 78.

The splines 78 are modified to have a tapered ramp section 80 in order to gradually engage the internal teeth 42 of the sliding reverse gear 8 when it is moved forward on the shaft 4 to slide up onto the splines 78. The reverse fork 50 has a recess 55 in the interior of the fork 50 in which the spring 54 is retained. The spring 54 biases the pin 56 towards engagement with a recess 58 in the ridge of the reverse sliding gear 40, as indicated in FIG. 17.

Figure 18:
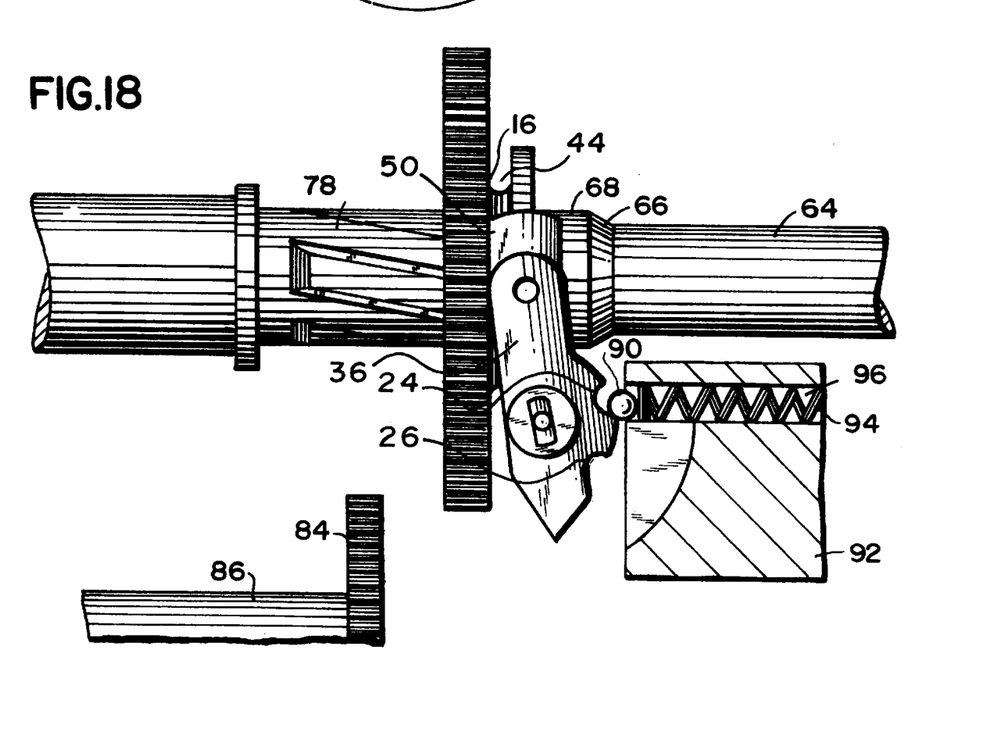
FIG. 18 is a side view of the reverse sliding gear, a portion of the reverse idler gear, rear, with the reverse sliding gear held in the non-engaged position on the main shaft by the spring detent pin.

FIG. 18 shows the reverse idle gear 8 in its neutral or coasting position on the bearing surface 68 of the shaft 4 with the fork 20 engaging on the ridge 44[1] of the ring 40. The fork 20 is in the neutral position and maintained therein by the spring-loaded ball 90 as shown. Also shown in FIG. 18, is the reverse gear shaft 86 and gear 84.

Figure 17:
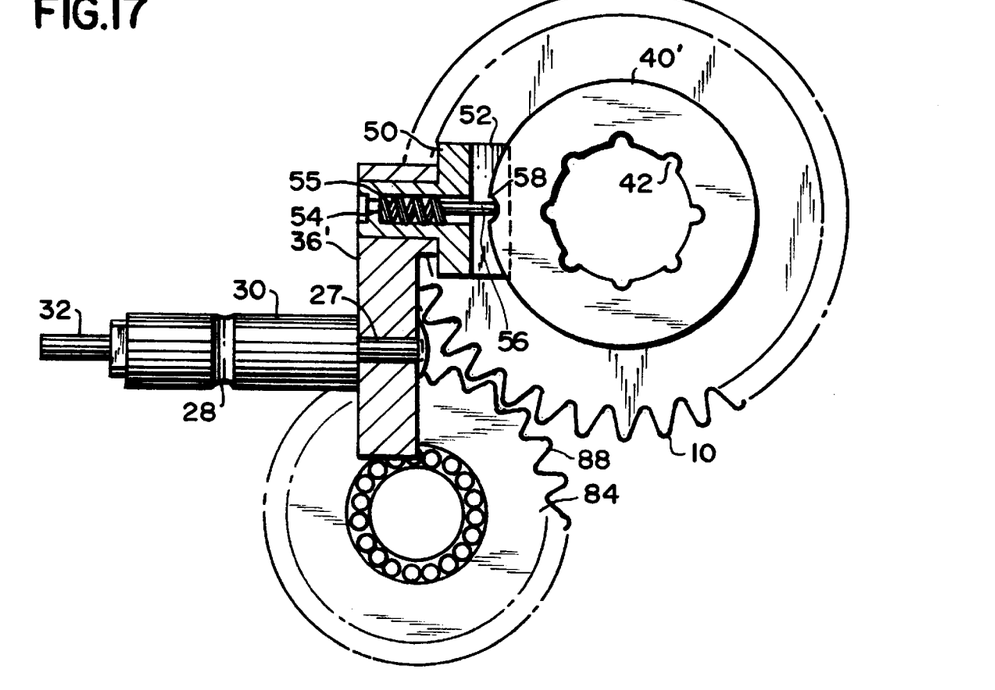
FIG. 17 is a view partially in section along lines 17—17 of FIG. 3.

FIG. 17 shows the relationship of the two gearing wheels 84 and 8 and the engaged yoke.

Figure 19:
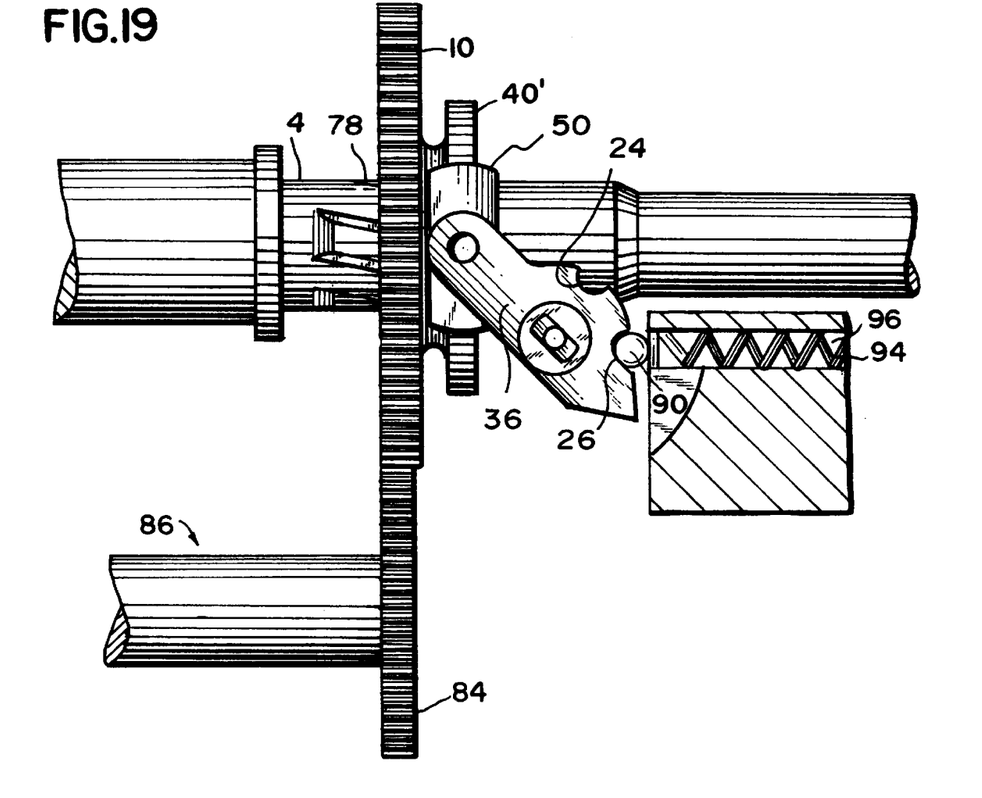
FIG. 19 is a similar side view as FIG. 18 of the main and reverse sliding gear, and reverse idler gear shaft, but showing the reverse sliding gear moved along the main shaft splines and engaged with the reverse idler gear rear with the detent ball holding the reverse sliding gear in position.
Figure 20:
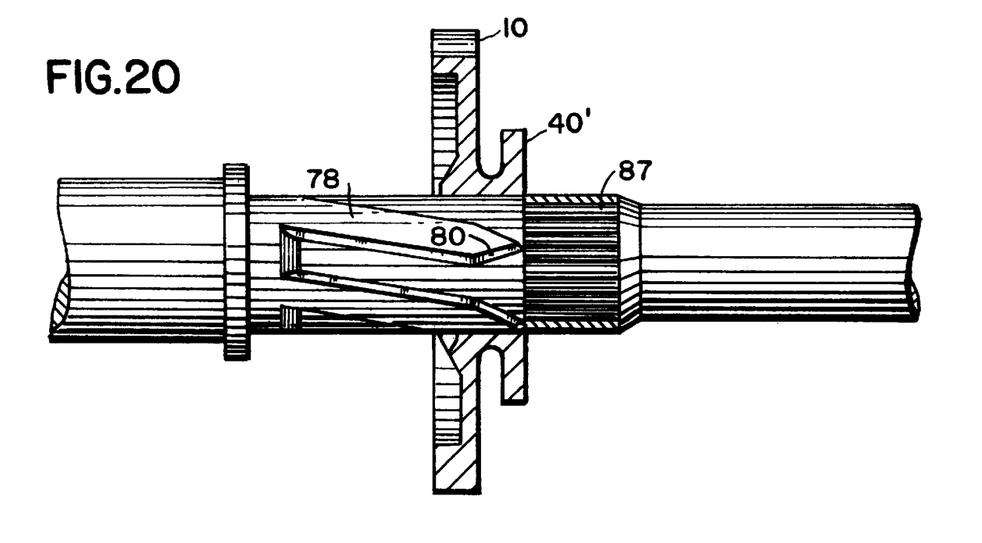
FIG. 20 is a side view of a portion of the main shaft, partially in section with the reverse sliding gear also in section.
Figure 21:
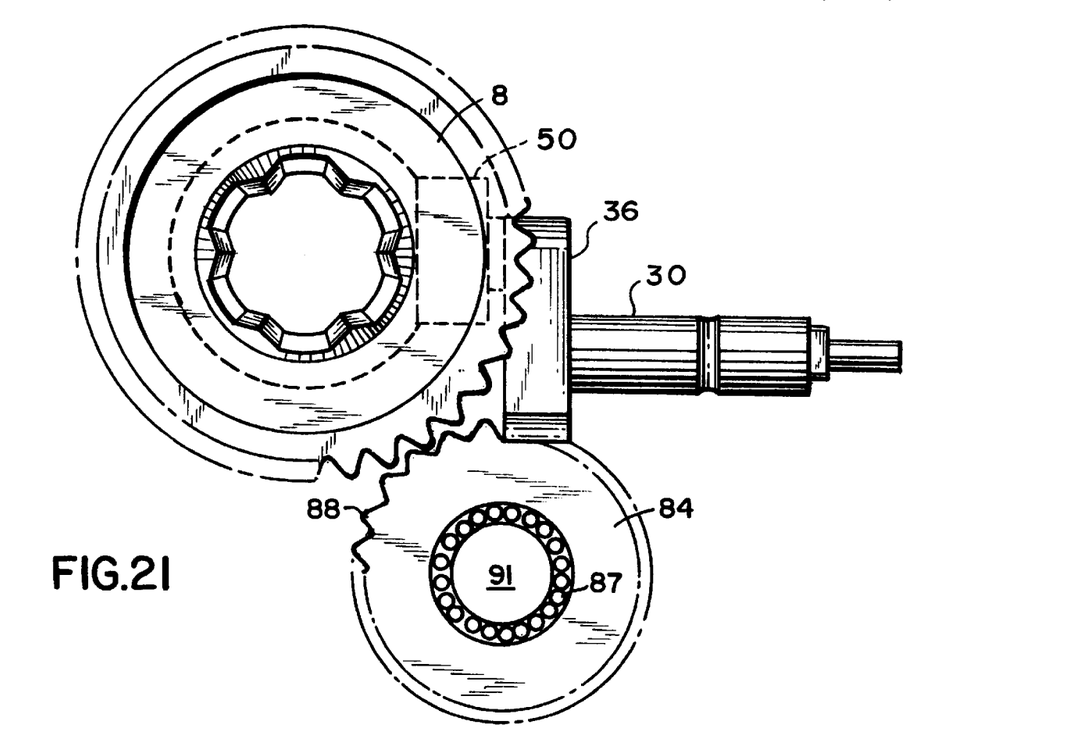
FIG. 21 is a view taken along lines 21—21 of FIG. 4 showing one side of the reverse sliding gear on the main shaft in engagement with the reverse idler gear rear.
Figure 22:
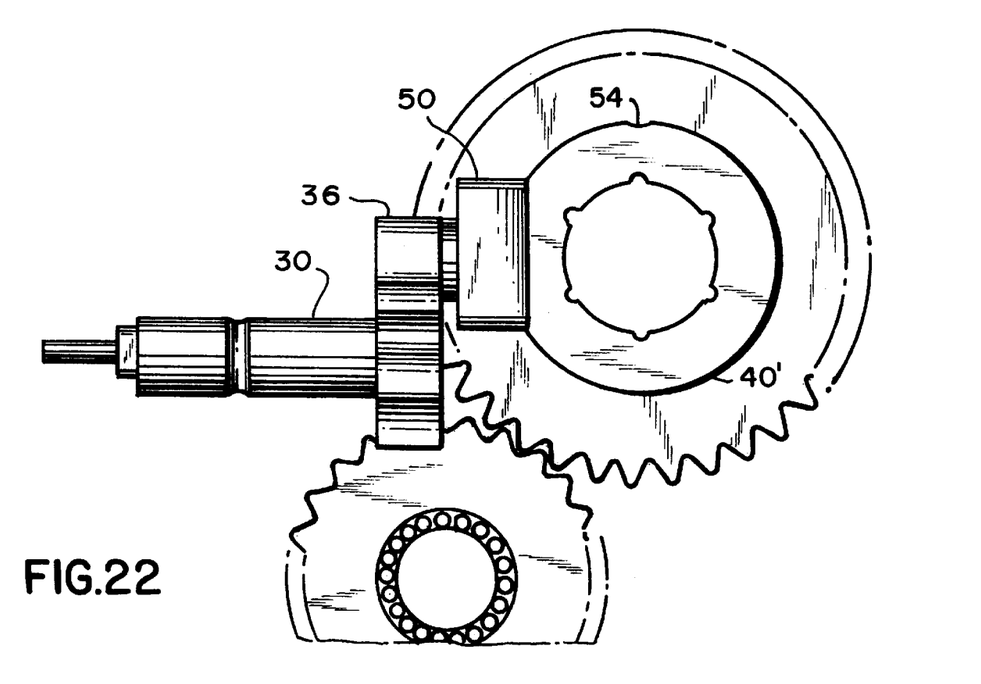
FIG. 22 is a view taken along the lines 22—22 of FIG. 4 taken from the opposite side as in FIG. 21.

In FIG. 19, the first shaft holder 36 has been turned to move the fork 50 forward and therefore slide the sliding gear 8 up over the splines 78 on the shaft 4, thereby causing the sliding gear 8 to turn, and simultaneously engage the reverse gear 84 on shaft 86 placing, the transmission into reverse drive.

A side view of this engagement process is shown in FIG. 19 showing the detent ball 90 on the lands or indent 26 holding the reverse gear 8 in the engaged position on the shaft 4.

FIGS. 17 and 18 show a modification on the reverse gear with the interior face hollowed out and a detent 58 for engagement of the pin 56 which keeps the gear 8 from rotating when not engaged on the shaft 4. In other words when the gear 8 is not engaged it will not freewheel on the shaft 4, thereby developing unnecessary and unwanted torque.

While the invention has been described by reference to an illustrative embodiment, it is not intended that the novel device be limited thereby, but that modifications thereof are intended to be included as falling within the broad spirit and scope of the foregoing disclosure, the following claims and the appended drawing.

What is claimed is:

1. A racing car multi-speed synchronized mesh transmission including a main shaft having splines which normally continuously engage a reverse sliding gear on its inner diameter and a reverse gear in the engaged position, a reverse idler gear and a reverse sliding gear, wherein said reverse sliding gear is advanced along said main shaft splines to engage said reverse idler gear, said reverse sliding gear having an engageable hub including a recess thereon axially spaced from said sliding gear and in sliding engagement and a gear shift fork, the improvement which comprises shortening said splines on said main shaft so that when said reverse sliding gear is not engaged with said reverse idler gear it is allowed to free wheel on said main shaft including means for engaging a detent pin with a recess on said hub so that said reverse sliding gear is halted from rotation when not engaged with said splines on the said main shaft, thereby preventing said reverse sliding gear from rotating when not engaged with said reverse idler gear and said main shaft splines.

2. A racing car multi-speed synchronized mesh transmission in accordance with claim 1 wherein:

the hub includes an aperture having a plurality of shaped grooves corresponding to the splines.

3. A racing car multi-speed synchronized mesh transmission in accordance with claim 1 wherein:

the main shaft includes a bearing surface adjacent the splines upon which the reverse sliding gear idles when not engaged on the spline.

4. A racing car multi-speed synchronized mesh transmission in accordance with claim 1 further including:

spring means engaging the detent pin to bias said pin into engagement with the hub recess.

* * * * *